US010337608B1

(12) United States Patent
Langenfeld

(10) Patent No.: US 10,337,608 B1
(45) Date of Patent: Jul. 2, 2019

(54) STEERABLE TRANSAXLE

(71) Applicant: Hydro-Gear Limited Partnership, Sullivan, IL (US)

(72) Inventor: Thomas J. Langenfeld, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 70 days.

(21) Appl. No.: 15/462,398

(22) Filed: Mar. 17, 2017

Related U.S. Application Data

(62) Division of application No. 14/577,441, filed on Dec. 19, 2014, now Pat. No. 9,598,103.

(60) Provisional application No. 61/919,423, filed on Dec. 20, 2013.

(51) Int. Cl.
| | |
|---|---|
| *F03C 1/06* | (2006.01) |
| *F16H 61/4157* | (2010.01) |
| *F16H 39/02* | (2006.01) |
| *F15B 11/16* | (2006.01) |

(52) U.S. Cl.
CPC ....... *F16H 61/4157* (2013.01); *F03C 1/0636* (2013.01); *F15B 11/16* (2013.01); *F16H 39/02* (2013.01); *F15B 2211/615* (2013.01); *F15B 2211/7058* (2013.01); *F15B 2211/71* (2013.01); *F15B 2211/715* (2013.01)

(58) Field of Classification Search
CPC .... F16H 61/4157; F03C 1/0636; F15B 11/16; F15B 39/02; B62D 5/12; B62D 5/20; B62D 5/22
See application file for complete search history.

(56) References Cited

U.S. PATENT DOCUMENTS

| | | | |
|---|---|---|---|
| 665,270 | A | 1/1901 | Rumely |
| 810,881 | A | 1/1906 | Pfouts et al. |
| 849,145 | A | 4/1907 | Ledwinka |
| 3,780,504 | A | 12/1973 | Haseloff |
| 4,024,695 | A | 5/1977 | Haseloff |
| 5,823,284 | A | 10/1998 | Hoar et al. |
| 6,926,111 | B1 | 8/2005 | Irikura |
| 7,066,199 | B1 | 6/2006 | Trimble et al. |
| 7,240,759 | B2 | 7/2007 | Uemura et al. |
| 7,476,172 | B1 | 1/2009 | Langenfeld et al. |
| 7,690,470 | B2 | 4/2010 | Iwaki et al. |
| 7,739,870 | B2 | 6/2010 | Carlson et al. |
| 7,841,176 | B1 | 11/2010 | Langenfeld et al. |

(Continued)

FOREIGN PATENT DOCUMENTS

| | | |
|---|---|---|
| WO | WO2012091699 | 7/2012 |
| WO | WO2012169663 | 12/2012 |

*Primary Examiner* — Joseph M Rocca
*Assistant Examiner* — Michael R Stabley
(74) *Attorney, Agent, or Firm* — Neal, Gerber & Eisenberg LLP

(57) ABSTRACT

A drive apparatus includes an internal sump and a center section having a pump running surface for mounting a pump cylinder block and at least one motor running surface for mounting at least one motor cylinder block. A brake mechanism includes set of brake rod guides are formed in and extend from the center section adjacent the pump running surface and the one or more motor running surfaces for supporting one or more brake rods. The brake rods may engage the motor cylinder blocks at oblique angle thereto, to provide a braking force. The brake mechanism may include a brake shaft, and a brake arm attached thereto and operatively engaged to the brake rods.

21 Claims, 15 Drawing Sheets

(56) References Cited

U.S. PATENT DOCUMENTS

| | | |
|---|---|---|
| 7,918,305 B2 | 4/2011 | Scherbring et al. |
| 8,091,672 B2 | 1/2012 | Gutsch et al. |
| 8,393,236 B1 | 3/2013 | Hauser et al. |
| 8,857,554 B1 | 10/2014 | Keller |
| 8,882,119 B2 | 11/2014 | Burns, Jr. |
| 8,919,116 B1 | 12/2014 | Langenfeld et al. |
| 8,950,520 B2 | 2/2015 | Hauser et al. |
| 9,371,842 B1 | 6/2016 | Langenfeld |
| 9,408,344 B1 | 8/2016 | Langenfeld |
| 2002/0125672 A1 | 9/2002 | Lee |
| 2006/0042839 A1 | 3/2006 | Iwaki et al. |
| 2013/0282212 A1 | 10/2013 | Michael et al. |
| 2013/0282214 A1 | 10/2013 | Goebel et al. |

STEERABLE TRANSAXLE

CROSS REFERENCE

This application is a divisional of U.S. patent application Ser. No. 14/577,441, filed Dec. 19, 2014, which claims the benefit of U.S. Provisional Patent Application No. 61/919,423, filed on Dec. 20, 2013. The contents of these applications are fully incorporated herein by reference.

BACKGROUND

This invention relates to transmissions for vehicles in general and, more particularly, to hydrostatic transmissions for vehicles such as garden tractors and lawn tractors. A hydrostatic transmission (HST) is a well-known type of continuously variable transmission wherein a system of one or more hydraulic pumps transmits energy from an input shaft to one or more hydraulic motors connected to one or more output shafts. The input shaft is typically driven by a prime mover, such as an internal combustion engine or an electric motor. The one or more output shafts are typically connected, either directly or indirectly, to a pair of the vehicle's wheels to propel the vehicle. The hydraulic pumps and motors are contained within a transmission housing filled with hydraulic fluid, which flows in a fluid circuit from pump to motor and back again through hydraulic porting formed in a center section. It is this flow of hydraulic fluid that transmits energy from the pump(s) to the motor(s). Direction of vehicle travel depends on the direction of flow within the hydraulic circuit.

SUMMARY

The present invention teaches a drive apparatus for an application such as a lawn tractor comprising an HST driving steerable wheels in a unitary design. The HST comprises a central section that contains a single hydraulic pump and two hydraulic motors. The geometry of the pump and motor configuration enables a reduced vehicle turning radius, which increases vehicle maneuverability, thereby reducing the time required to complete a task. Additionally, the wheel pivoting geometry of this design is, in the case of a lawn tractor for example, gentler on the vehicle tires and surfaces traversed when traveling and/or mowing. A steering mechanism to pivot the wheel hub assemblies is included and is integrally supported by certain housing components of the drive apparatus. The drive apparatus also includes a power take off (PTO) mechanism integrated therewith that is powered directly by a prime mover that is mounted on the drive apparatus. This application is related to U.S. Ser. No. 14/535,664 filed on Nov. 7, 2014 and entitled "Three Wheeled Vehicle," now U.S. Pat. No. 9,408,344. The terms of that patent are incorporated herein by reference in their entirety.

A better understanding of the objects, advantages, features, properties, and relationships of the invention will be obtained from the following detailed description and accompanying drawings, which set forth one or more illustrative embodiments that are indicative of the various ways in which the principles of the invention may be employed.

DETAILED DESCRIPTION OF THE DRAWINGS

Figure 1:
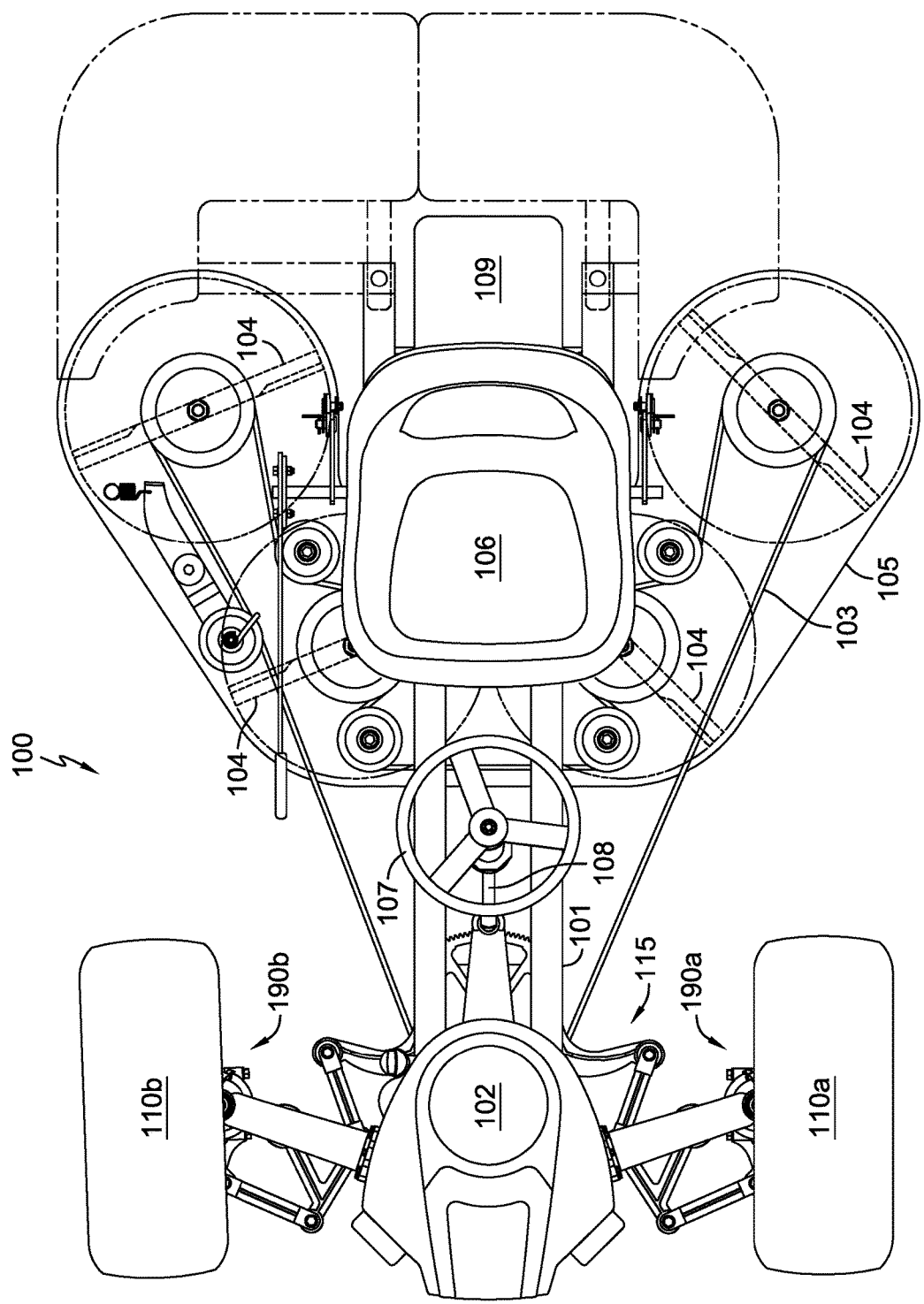
FIG. 1 is a representational top plan view of a front wheel drive, three-wheeled mowing vehicle having a steerable transaxle in accordance with the principles disclosed herein.

The description that follows describes, illustrates, and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

FIG. 1 shows a mowing vehicle 100 having two steered front wheels 110a and 110b and a single non-steered rear wheel 109. Rear wheel 109 is rotatably mounted on a rear axle. Vehicle 100 also has a vehicle frame 101 that supports various components of vehicle 100 (including seat 106), as described in further detail below.

A prime mover 102 is mounted to vehicle frame 101 and transaxle 115. Prime mover 102 provides power to transaxle 115 to propel vehicle 100 by means of powering steered wheels 110a, 110b. Transaxle 115 is described in detail below.

Prime mover 102 also drives a belt and pulley system 103 that is coupled to and drives cutting blades 104. As shown in FIG. 1, cutting blades 104 are housed within a deck 105. Deck 105 has a top and a sidewall that cover and protect cutting blades 104. When viewed from above, deck 105 has a U-shape. A first portion of deck 105, which forms the base of the U-shape, is positioned in front of rear wheel 109. A second portion and a third portion of deck 105 extend rearward and adjacent to the sides of rear wheel 109. A first cutting blade 104 is positioned within deck 105 adjacent one side of rear wheel 109 and a second cutting blade 104 is positioned within deck 105 adjacent the opposite side of rear wheel 109. A third and a fourth cutting blade 104 are positioned within deck 105 and forward of rear wheel 109. As shown in FIG. 1, cutting blades 104 are generally the same size as one another. It will be understood that deck 105 may be articulated and/or include supporting wheels or rollers to prevent scalping, as is known in the art. It is contemplated that the position, as illustrated, of certain portions of deck 105 in relation to rear wheel 109 may contribute to the overall stability of vehicle 100, i.e., with the outboard deck portions functioning as vehicle tip-limiters or outriggers.

Figure 2:
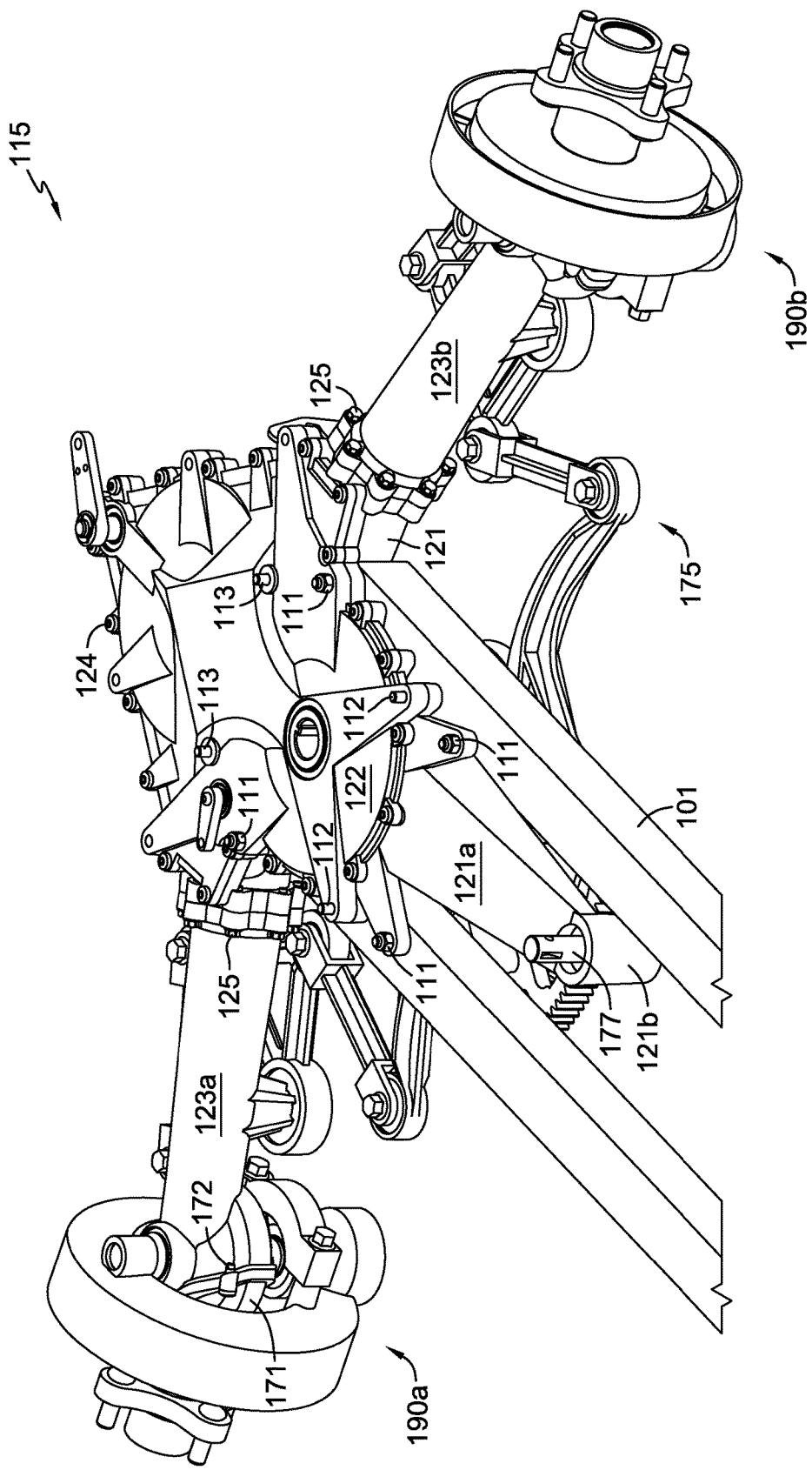
FIG. 2 is a top perspective view of a portion of the vehicle of FIG. 1 including the transaxle and a portion of the vehicle frame.

A steering input device 107, shown in FIG. 1 as a steering wheel, receives user input and translates that input via a steering shaft 108 to steering mechanism 175 (shown in FIG. 2). Steering mechanism 175 includes a plurality of linkages that connect to and steer steered wheels 110a and 110b, which are attached to steering mechanism 175 via wheel hub assemblies 190a and 190b as described in detail below. A main housing member 121 of transaxle 115, referred to herein as main housing 121, provides support and attachment features for steering mechanism 175 as described below.

Figure 3:
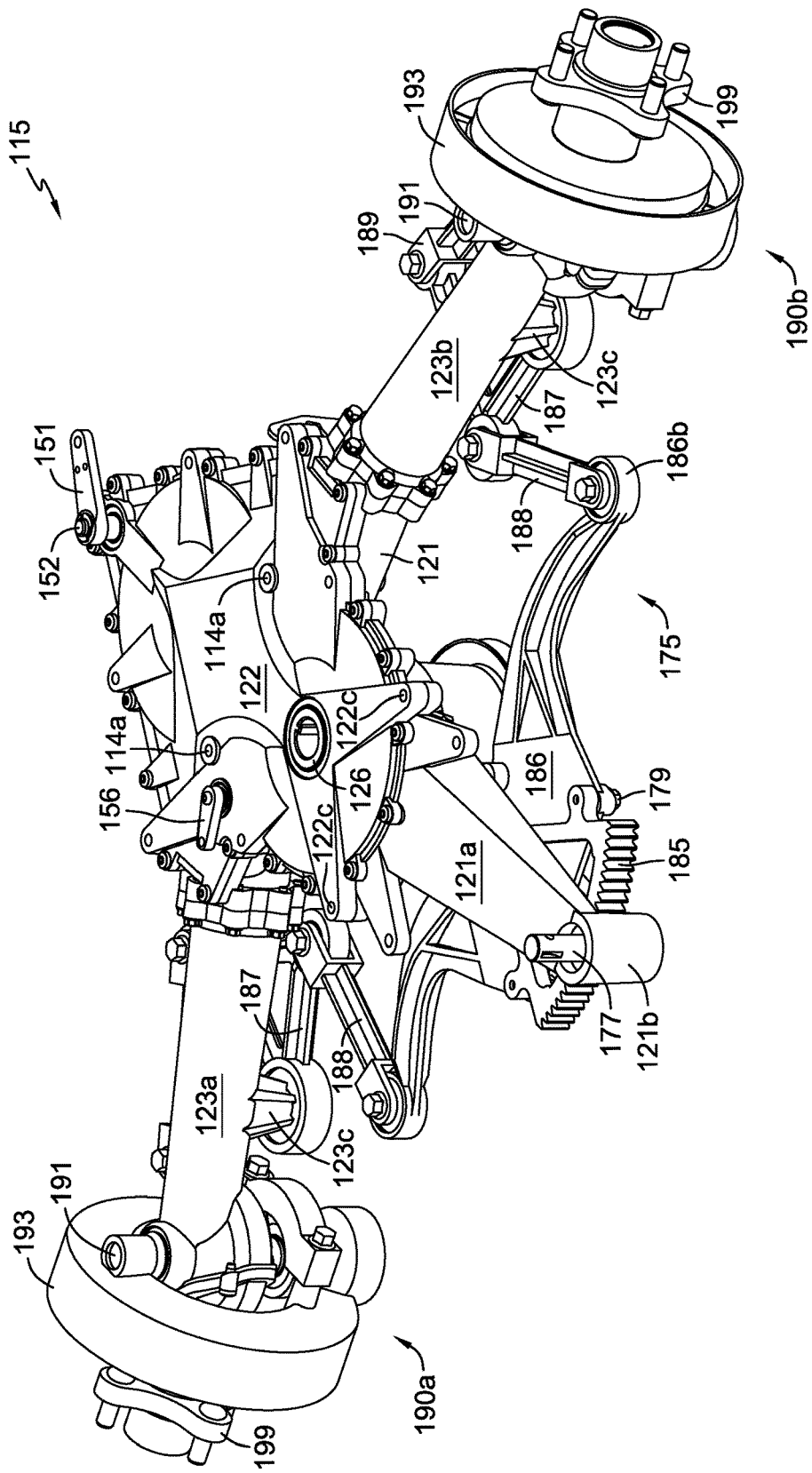
FIG. 3 is a top perspective view of the steerable transaxle of FIG. 2.
Figure 4:
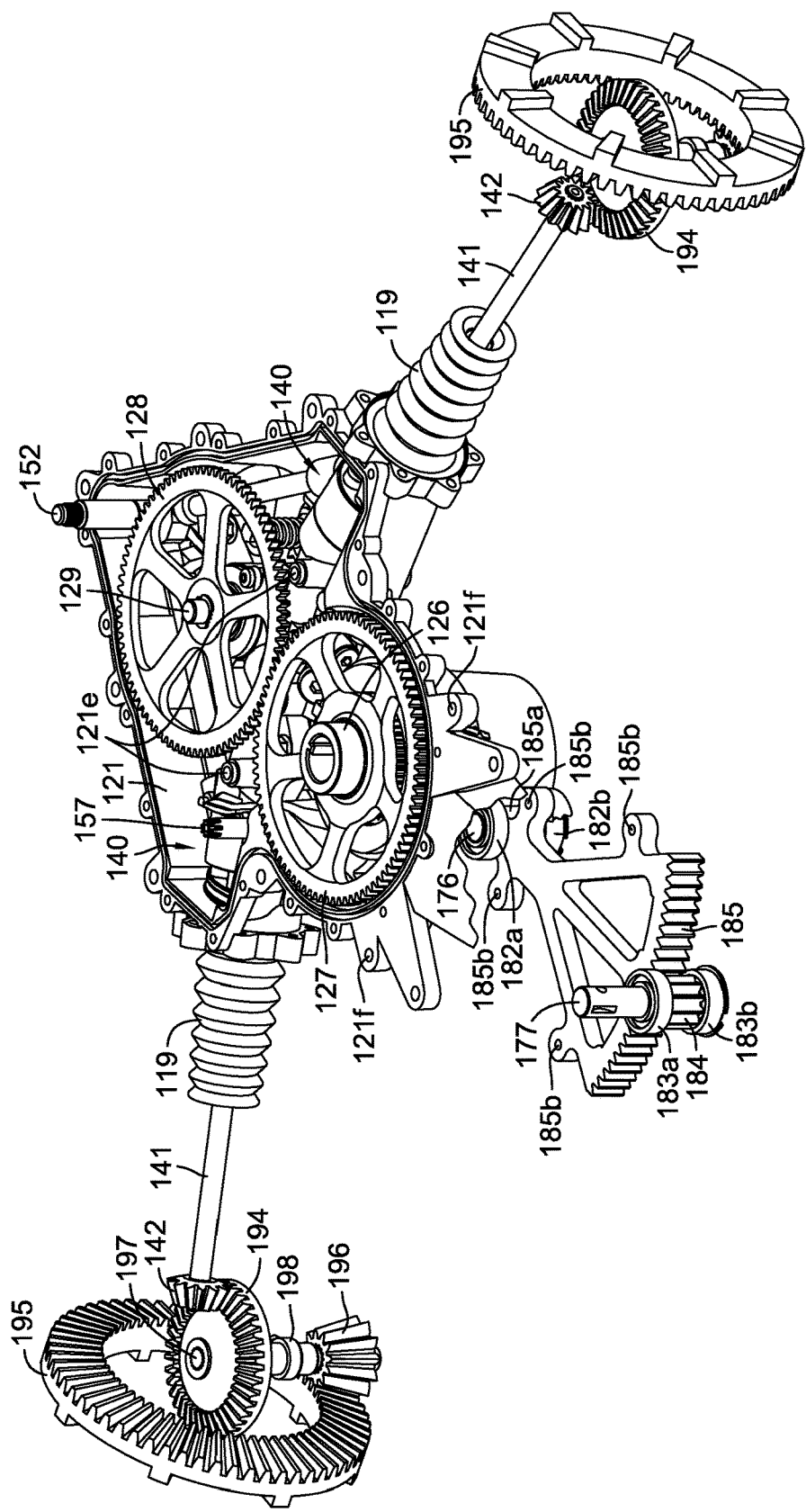
FIG. 4 is a perspective view of the transaxle shown in FIG. 3 with certain housing and other components removed and with a portion of the main housing cut away for clarity.
Figure 5:
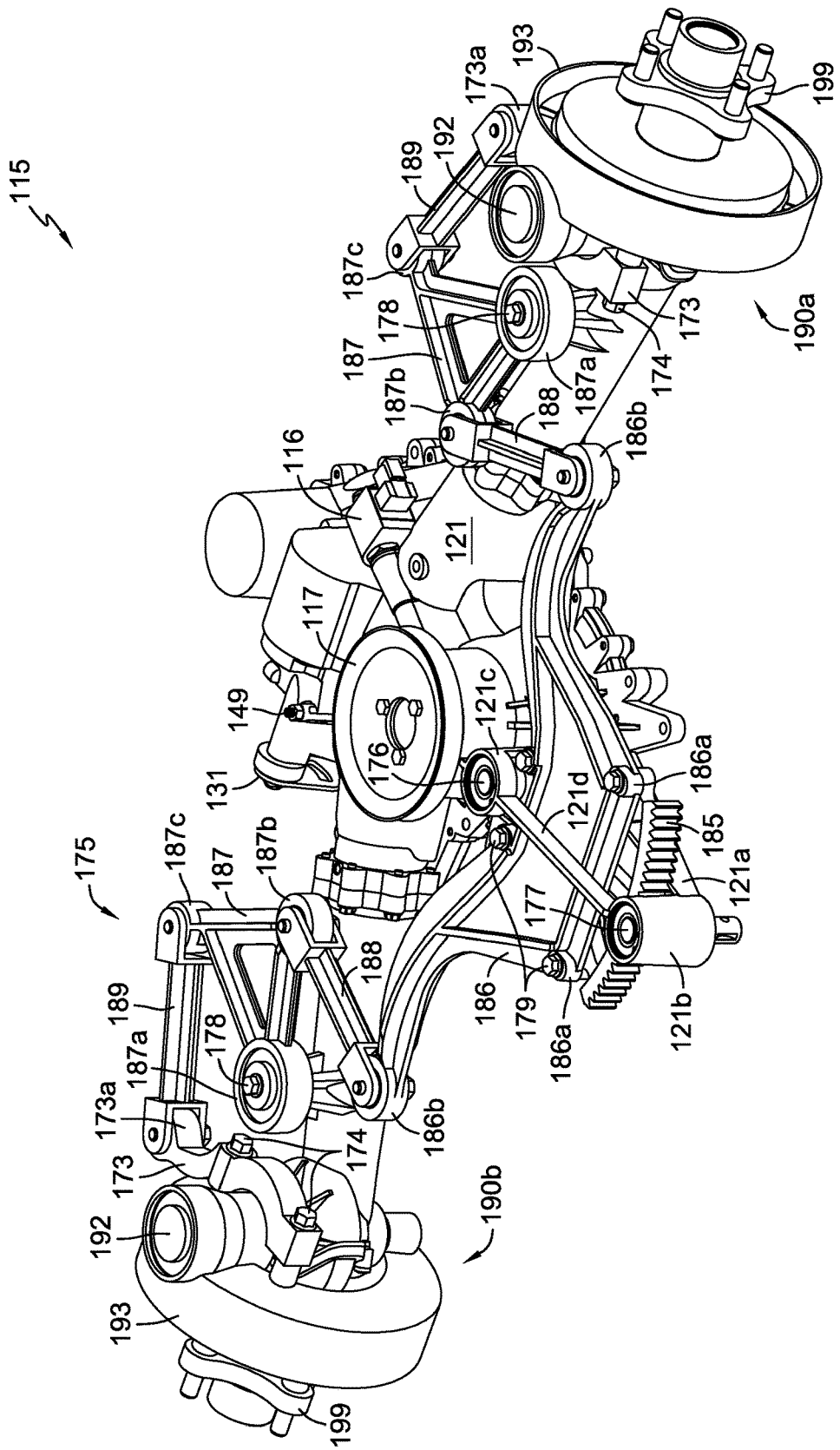
FIG. 5 is a bottom perspective view of the transaxle of FIG. 3.
Figure 6:
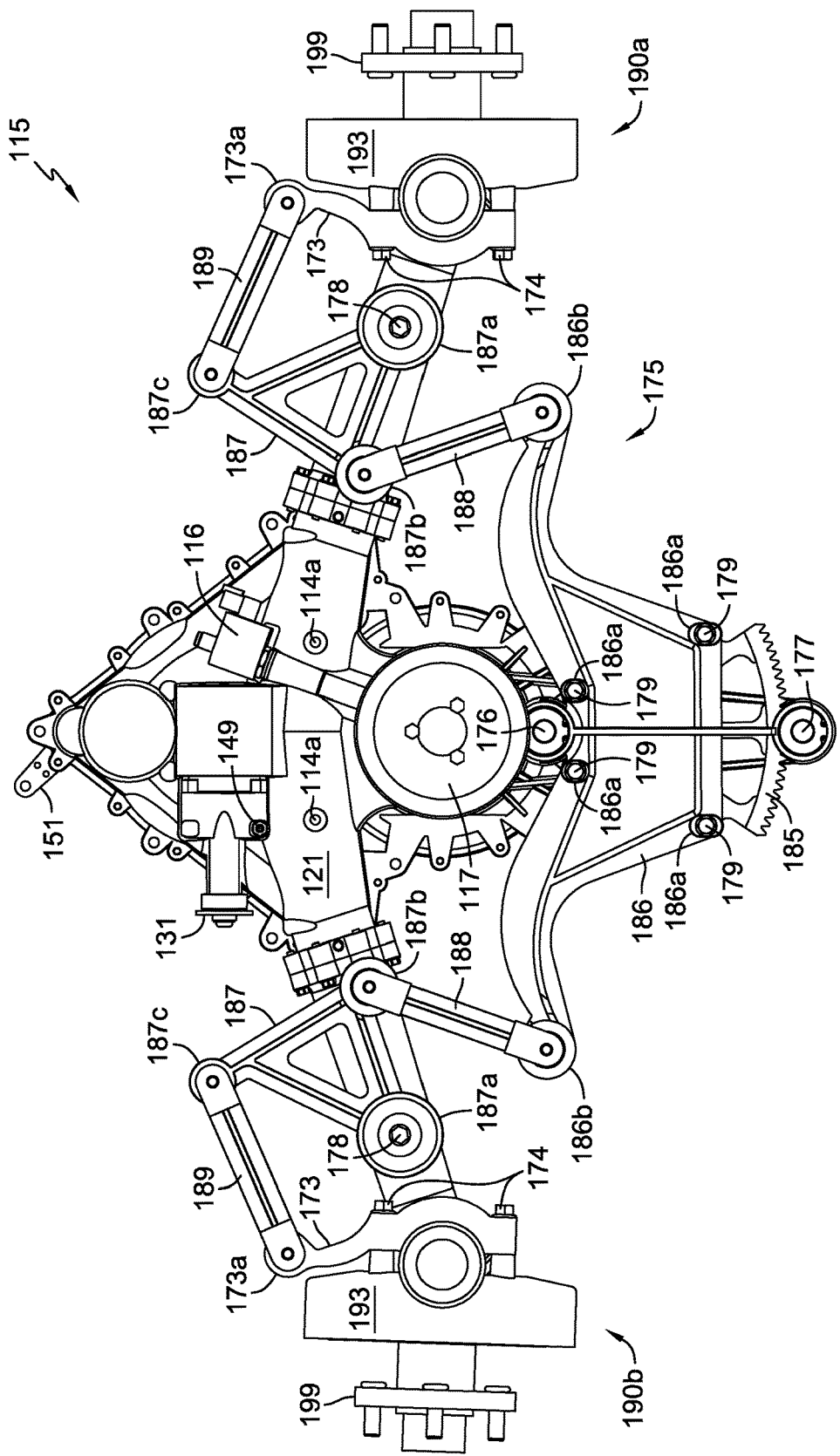
FIG. 6 is a bottom plan view of the transaxle of FIG. 3.
Figure 7:
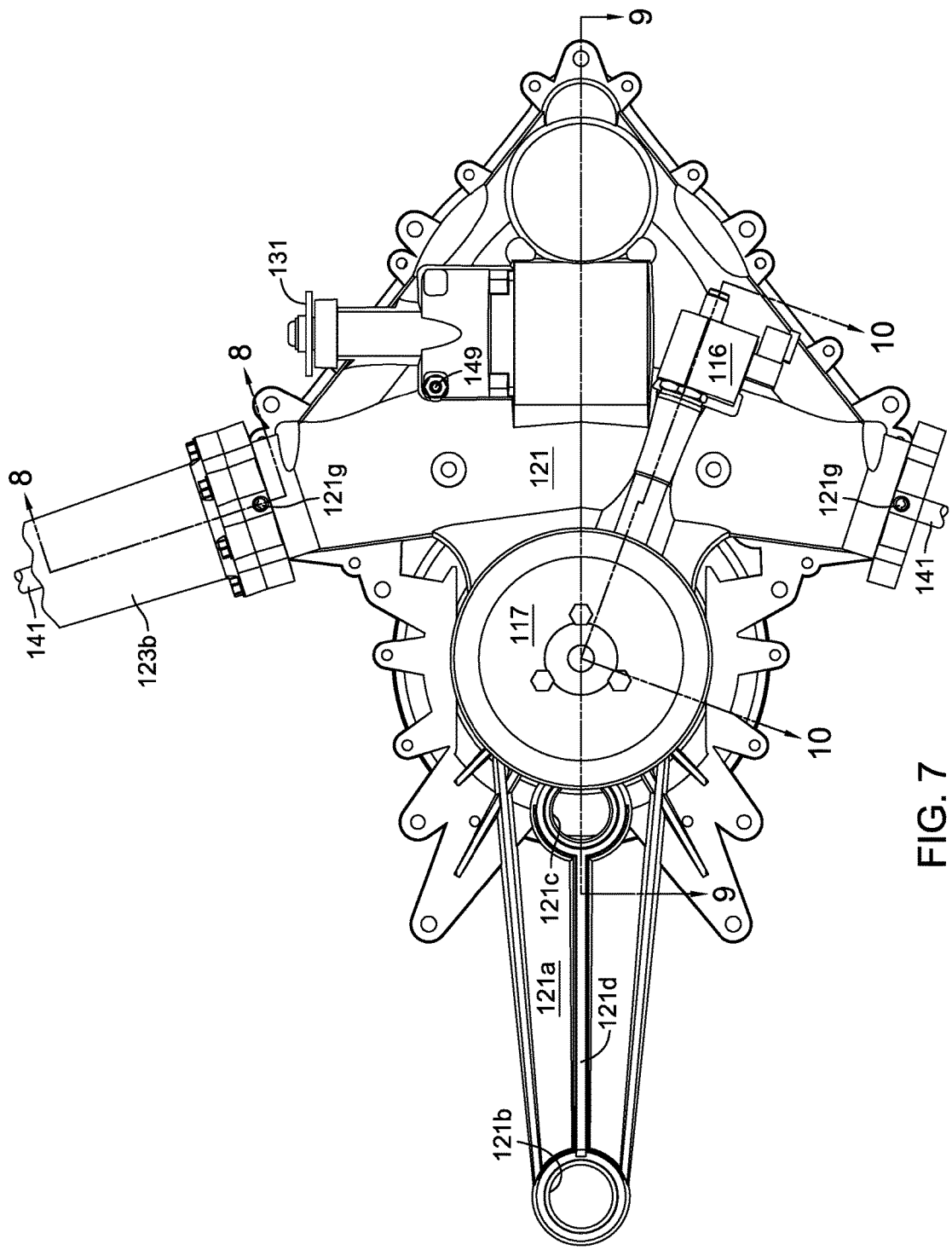
FIG. 7 is a bottom plan view of a portion of the transaxle of FIG. 3.

Details of steering mechanism 175 are shown in FIGS. 2 to 7. Steering shaft 108, shown in FIG. 1, is connected to a pinion shaft 177, which is rotatably disposed in steering pinion support 121b such that rotation of steering shaft 108 rotates pinion shaft 177. Steering pinion support 121b is formed in a steering support structure 121a, which is a portion of main transaxle housing 121 that extends generally rearward relative to the illustrated orientation of vehicle 100. As shown in FIG. 5, steering pinion support 121b is further supported by a brace 121d, which extends rearward in generally the same direction as steering support structure 121a. A first end of brace 121d connects to steering pinion support 121b and a second end of brace 121d connects to pivot pin support 121c. A slat-shaped opening is defined between brace 121d and steering support structure 121a. As shown, brace 121d can be integrally formed as part of main housing 121.

As shown in FIG. 4, a pinion gear 184 is mounted on pinion shaft 177 to rotate therewith. An upper pinion bearing 183a and a lower pinion bearing 183b are housed in steering pinion support 121b to facilitate rotation of pinion shaft 177 relative to main housing 121.

Steering mechanism 175 also includes a steering rack 186, which has a sector gear 185 mounted thereto via a plurality of fasteners 179. Fasteners 179 connect steering rack mounting bosses 185b formed in sector gear 185 to a plurality of corresponding sector gear mounting bosses 186a formed in steering rack 186.

Sector gear 185 is rotatably mounted to main housing 121. A steering rack pivot pin 176 passes through a sector gear pivot collar 185a formed in sector gear 185 and through steering pivot pin support 121c (shown in FIG. 5) formed in main housing 121, thereby rotatably connecting sector gear 185 and steering rack 186 to main housing 121. Steering pivot pin support 121c includes an upper portion and a lower portion with an opening therebetween through which sector gear 185 extends. An upper pivot pin bearing 182a and a lower pivot pin bearing 182b are housed in steering pivot support 121c to facilitate rotation of sector gear 185 relative to main housing 121.

Sector gear 185 meshes with pinion gear 184 such that rotation of pinion gear 184 causes rotation of sector gear 185 and thus rotation of steering rack 186 about the axis of steering rack pivot pin 176. Thus, rotation of steering shaft 108 causes rotation of steering rack 186 about the axis of steering rack pivot pin 176. As shown in FIG. 5, sector gear 185 and steering rack 186 extend through and rotate within the opening defined by steering support structure 121a and brace 121d.

Steering mechanism 175 further includes a pair of pivot arms 187 that are rotatably connected to: (i) steering rack 186 via connectors, shown as tie rods 188 at mounting bosses 186b and 187b; (ii) motor shaft housings 123a and 123b at pivot arm collars 187a; and (iii) steered hub assemblies 190a and 190b via links 189 at mounting bosses 187c and 173a. Tie rods 188 and links 189 can be secured using screws installed through needle bearings at each end of each rod 188 and each link 189, as illustrated in, e.g., FIGS. 3 and 5. Alternatively, pins or other suitable fasteners, as well as other bearing types and bushings, or other combinations known in the art, can be used for these connections.

Pivot arms 187 are rotatably mounted to and supported by motor shaft housings 123a and 123b at pivot arm collars 187a via pivot arm kingpin bolts 178. Pivot arm kingpin bolts 178 pass through bearings in pivot arm collars 187a and into pivot arm mounting supports 123c, which are connected to and extend from motor shaft housings 123a and 123b. Thus, rotation of steering rack 186 causes pivot arms 187 to rotate about pivot arm kingpin bolts 178.

Aforementioned mounting bosses 173a are formed on steering arms 173 that are connected to spindles 193 of hub assemblies 190a and 190b via fasteners 174. Spindles 193 are in turn connected to hubs 199 to which steered wheels 110a and 110b are attached. As described in additional detail below, each spindle 193 is rotatably mounted to shaft 197 via a pair of bearings. Therefore, rotation of pivot arms 187 causes link 189 to act on and pivot hub assembly 190a or 190b about the rotational axis of shaft 197.

Thus, rotation of steering wheel 107 causes rotation of steering rack 186, which in turn rotates pivot arms 187. Rotation of pivot arms 187 causes rotation of steered hub assemblies 190a and 190b to which wheels 110a and 110b are mounted, thereby steering wheels 110a and 110b.

As shown in FIGS. 2 and 3, transaxle 115 includes a centrally located main housing 121 joined to motor shaft housings 123a, 123b by fasteners 125. Housing cover 122 is joined to main housing 121 by fasteners 124 and end caps 171 are joined to motor shaft housings 123a, 123b by fasteners 172. These joints are sealed to form a sump 120 (shown in FIG. 8) that provides hydraulic fluid throughout the interior of transaxle 115 for the operation of the hydrostatic transmission components, such as pump assembly 130 (shown in FIG. 9) and motor assemblies 140 (shown in FIG. 4) disposed on center section 135 (shown in FIGS. 9 and 11), and for hydraulic PTO mechanism 160 (shown in FIGS. 9 and 10). Additionally, sump 120 provides lubrication for various bearings, gears, and other moving parts, including certain gears located in steerable hub assemblies 190*a* and 190*b*.

Figure 8:
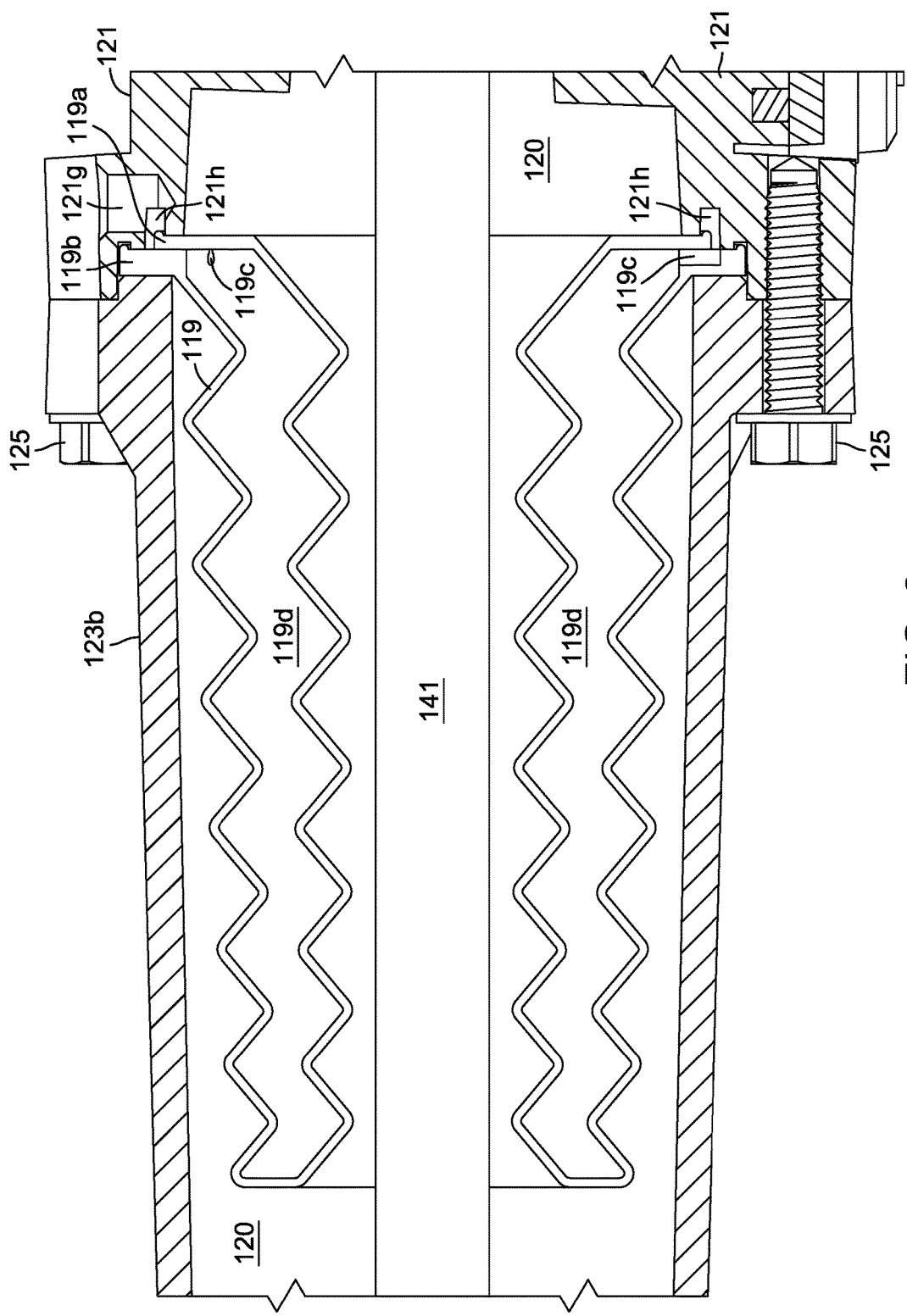
FIG. 8 is a cross-sectional view along line 8-8 of FIG. 7.

As illustrated in FIGS. 4 and 8, an expandable member shown as a bellows 119 is provided in each motor shaft housing 123*a*, 123*b* to accommodate fluid expansion inside sealed transaxle 115. Bellows 119 is disposed about each motor shaft 141 such that hydraulic fluid of sump 120 can flow around bellows 119 to fill motor shaft housings 123*a*, 123*b*. Allowing hydraulic fluid into motor shaft housings 123*a*, 123*b* reduces the operating temperature of transaxle 115 and provides fluid to lubricate pinion gears 142 and upper bevel gears 194. Each bellows 119 includes a first flange 119*a* that butts against main housing 121 and a second flange 119*b* that butts against both first flange 119*a* and main housing 121. When motor shaft housings 123*a*, 123*b* are attached to main housing 121, flanges 119*a* and 119*b* are captured and pressed together to form air chamber 119*d*. A plurality of vent grooves 119*c* are formed in second flange 119*b* to vent air from chamber 119*d* into annular groove 121*h* formed in main housing 121 and out through breather port 121*g* (which is in pneumatic communication with annular groove 121*h*) formed in main housing 121 when the fluid temperature of transaxle 115 rises. As the fluid temperature of transaxle 115 falls, air is drawn back into chamber 119*d* via annular groove 121*h* and vent grooves 119*c*. Breather port 121*g* is also used to apply suction to chamber 119*d* via annular groove 121*h* and vent grooves 119*c* to collapse bellows 119 at assembly to ensure that bellows 119 is not distorted as sump 120 is filled with hydraulic fluid. After the appropriate amount of hydraulic fluid is added to sump 120, suction is removed from breather port 121*g* so that bellows 119 is allowed to expand to its proper undistorted shape. While it is preferred to have a bellows 119 located in each motor shaft housing 123*a*, 123*b*, it should be understood that a transaxle similar to transaxle 115 but equipped with a single bellows 119 in only one of the motor shaft housings 123*a* or 123*b* is also contemplated within the scope of the invention, e.g., where service with lesser operating temperatures and fluid expansion is required.

Figure 9:
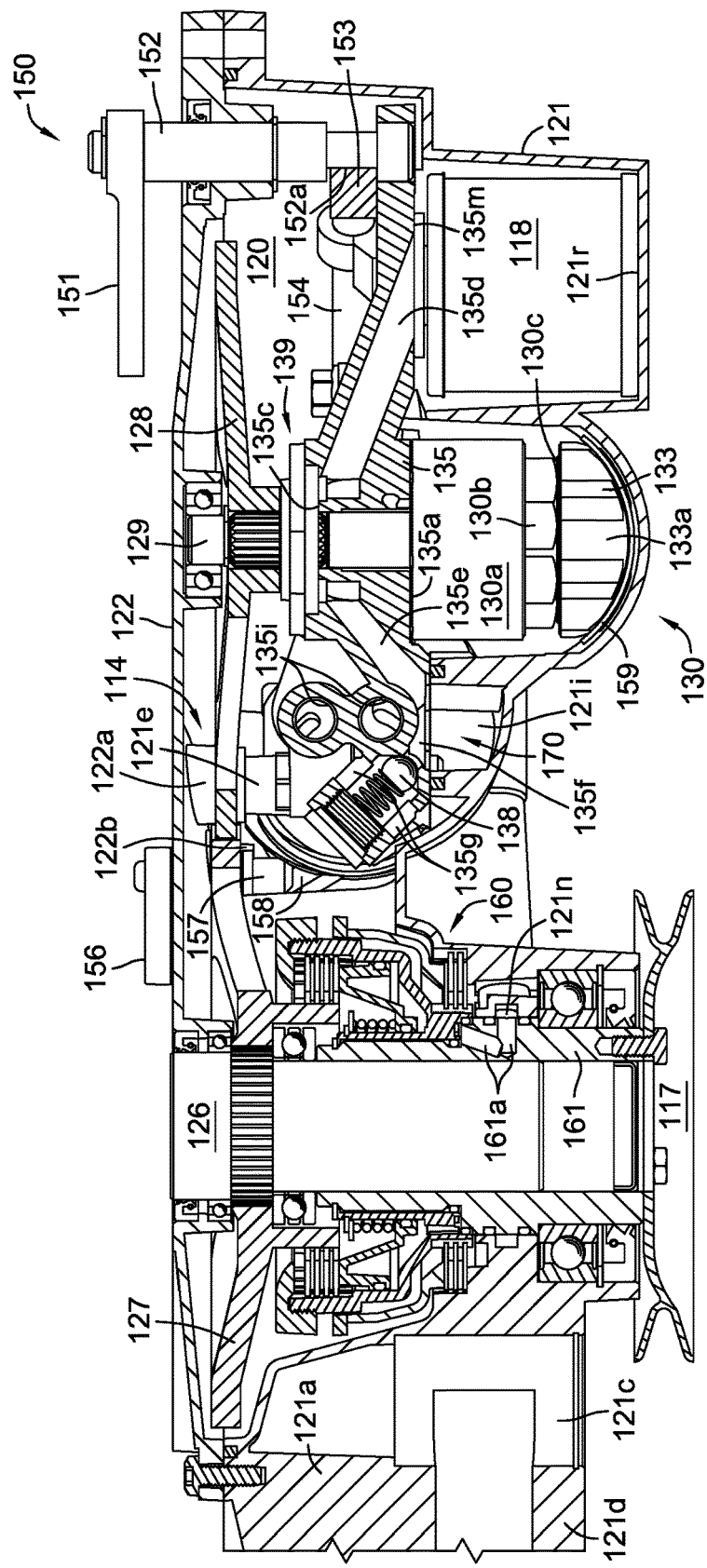
FIG. 9 is a cross-sectional view along line 9-9 of FIG. 7.
Figure 10:
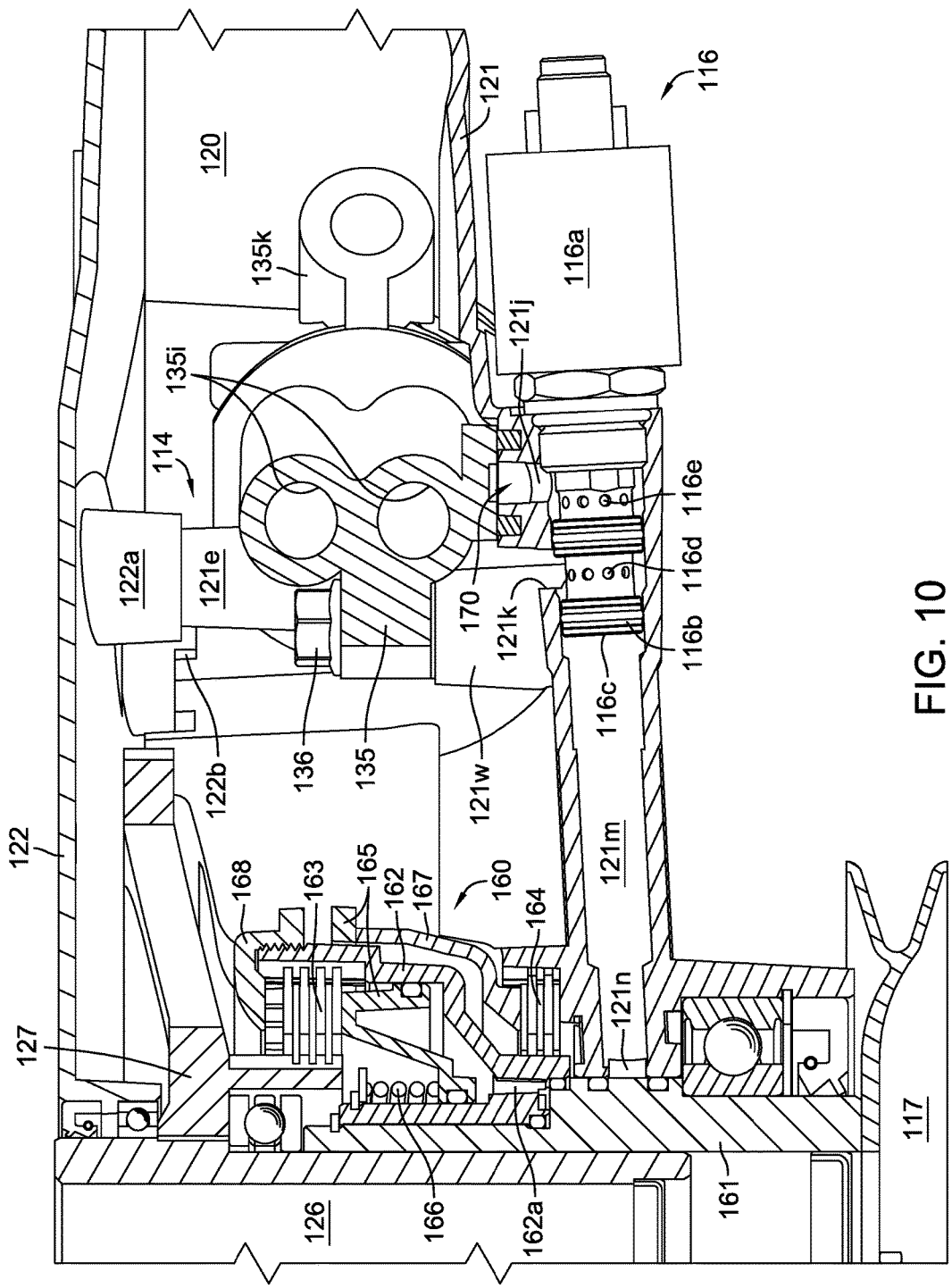
FIG. 10 is a cross-sectional view along line 10-10 of FIG. 7.
Figure 15:
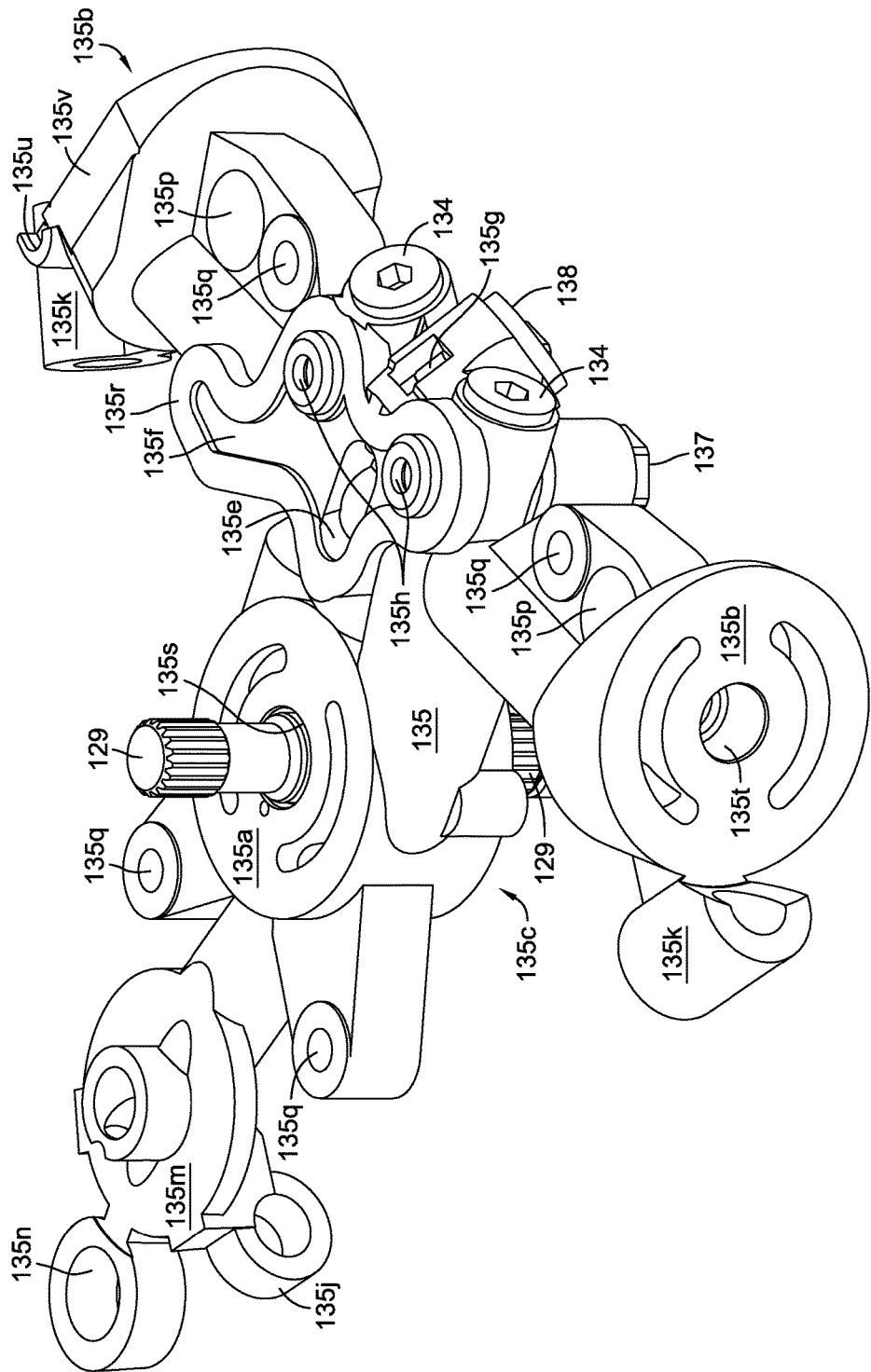
FIG. 15 is a top perspective view of the center section of the hydrostatic transmission of the transaxle of FIG. 3 including certain additional components.

Prime mover 102 is mounted on transaxle 115 and drives input tube 126. As shown in FIGS. 4 and 9, input tube 126 is drivingly engaged to a clutch gear 127 that carries a portion of clutch plates 163, as shown in FIG. 10, and also drives a pump gear 128. Pump gear 128 is drivingly engaged to a pump input shaft 129. As shown in FIG. 9, pump input shaft 129 is supported at its upper end by a bearing located in housing cover 122 and extends through a journal opening 135*s* formed in center section 135, as shown in FIG. 15. Journal opening 135*s* may have a journal bearing installed therein to improve wear characteristics. Pump input shaft 129 drives a gerotor charge pump 139 located proximate to its upper end and a pump assembly 130 positioned at its lower end. Pump gear 128 is supported on thrust washer 139*a* recessed in charge pump cover 139*b* that is shown, e.g., in FIG. 13. Gerotor charge pump 139 is disposed on charge pump running surface 135*c* on an upper side of center section 135 and pump assembly 130 is disposed on pump running surface 135*a* on an opposite, lower side of center section 135.

Referring to FIGS. 7, 9, 12, and 14, pump assembly 130 is a known axial piston pump configuration comprising a rotating cylinder block 130*a* carrying a set of spring-biased pistons 130*b* that bear against a thrust bearing 130*c* that is seated in a recess formed in swash plate 133. Swash plate 133 slides on cradle bearings 159 seated in swash plate pocket 121*s* formed in main housing 121. A control arm 131 is fixed to an end of shaft 132*a* of a trunnion arm 132 that extends from main housing 121. Protrusion 132*c* formed on arm portion 132*b* of trunnion arm 132 engages slot 133*a* formed in swash plate 133 to control the output of axial piston pump 130 in a known manner by moving swash plate 133 and associated thrust bearing 130*c* arcuately in a first or second direction from an initial hydraulic neutral position in order to ultimately cause wheel hubs 199 to rotate in a first or second direction. Arm 132*b* includes a pair of stops 132*d* formed thereon that come into contact with corresponding stops 121*y* formed in housing 121 to limit this arcuate movement. In the illustrated embodiment, trunnion arm 132 and swash plate 133 share a collinear axis of rotation.

Figure 11:
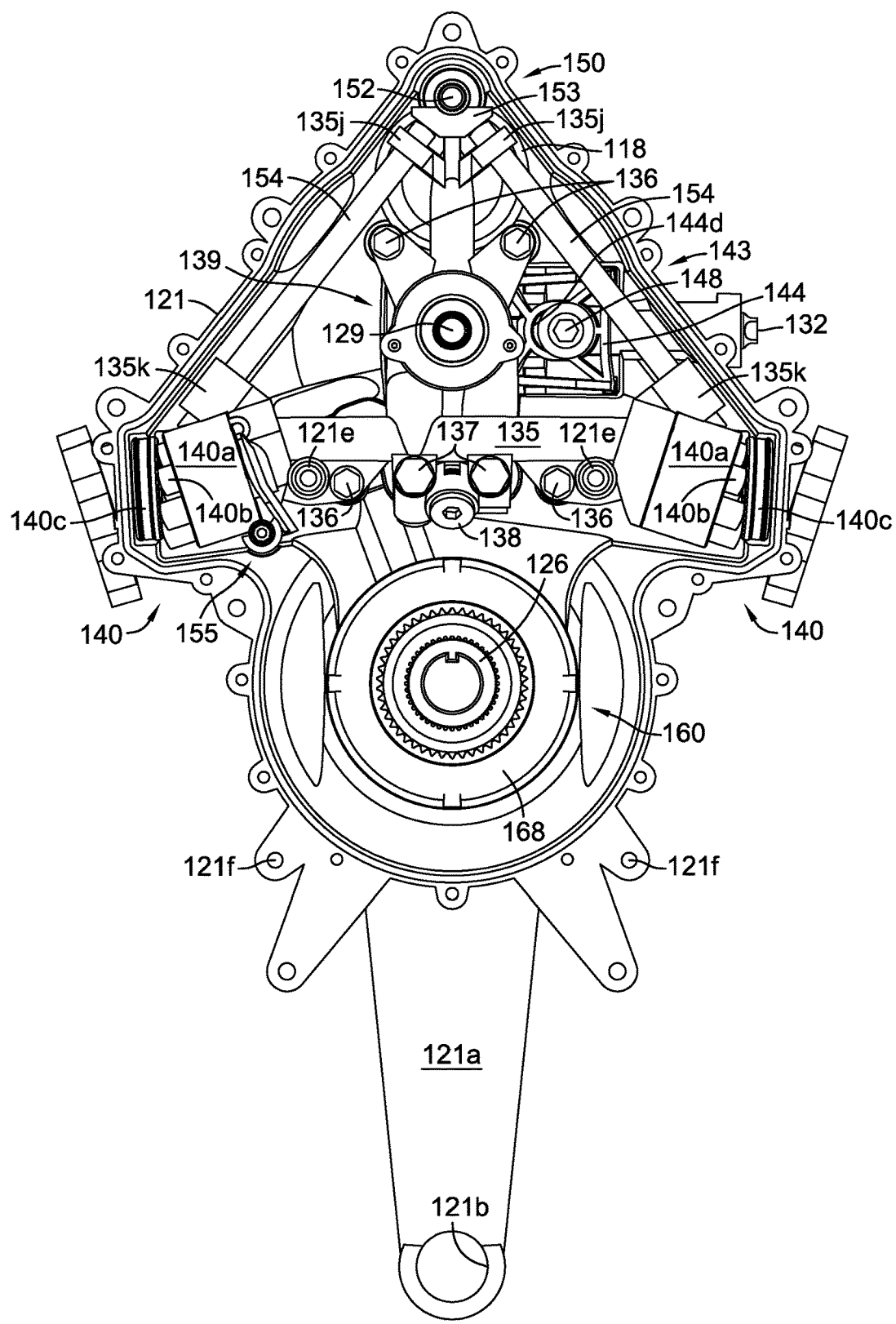
FIG. 11 is a top plan view of a portion of the transaxle of FIG. 3 including the hydrostatic transmission and the PTO mechanism.
Figure 12:
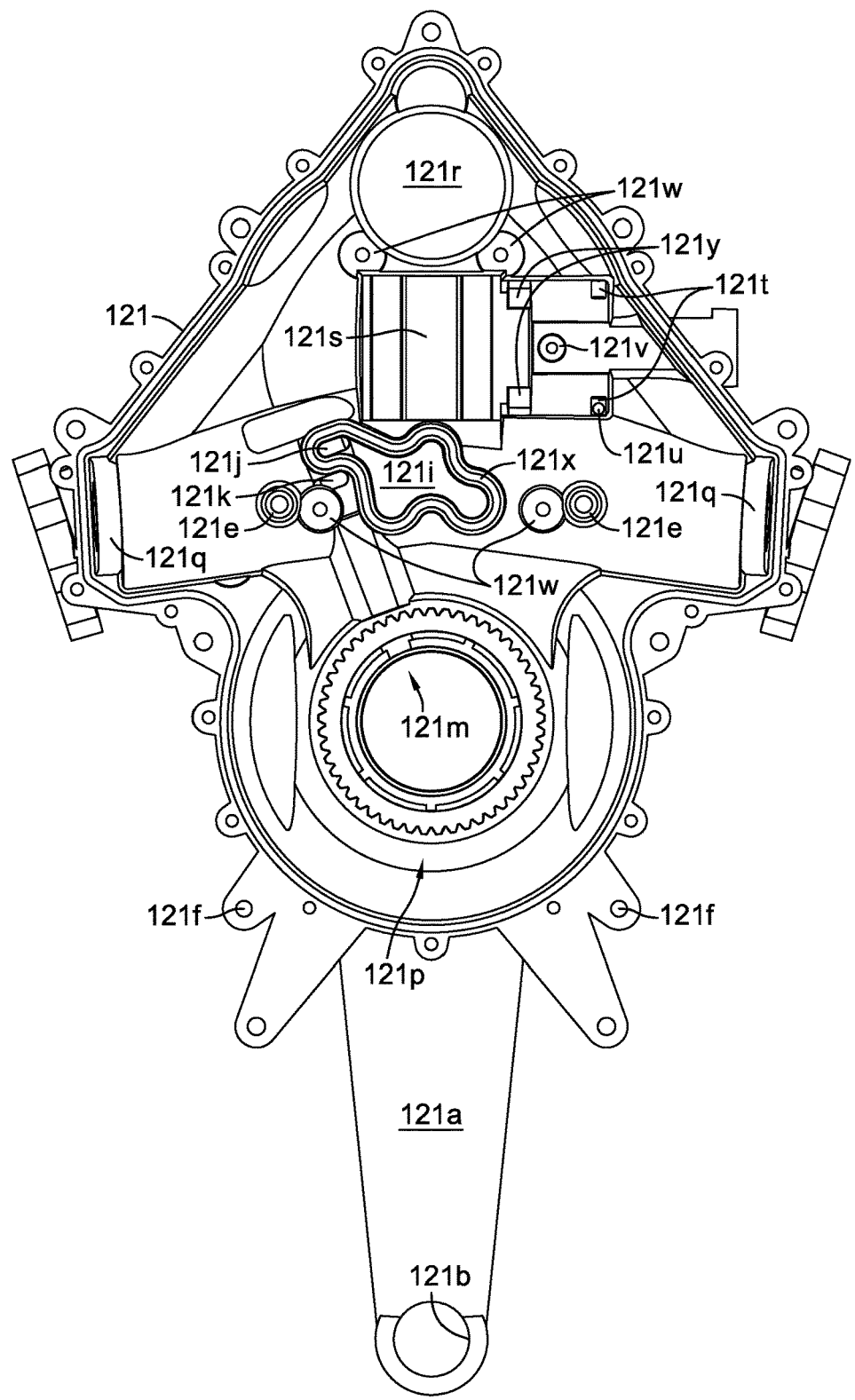
FIG. 12 is a top plan view of the main housing of the transaxle of FIG. 3.
Figure 13:
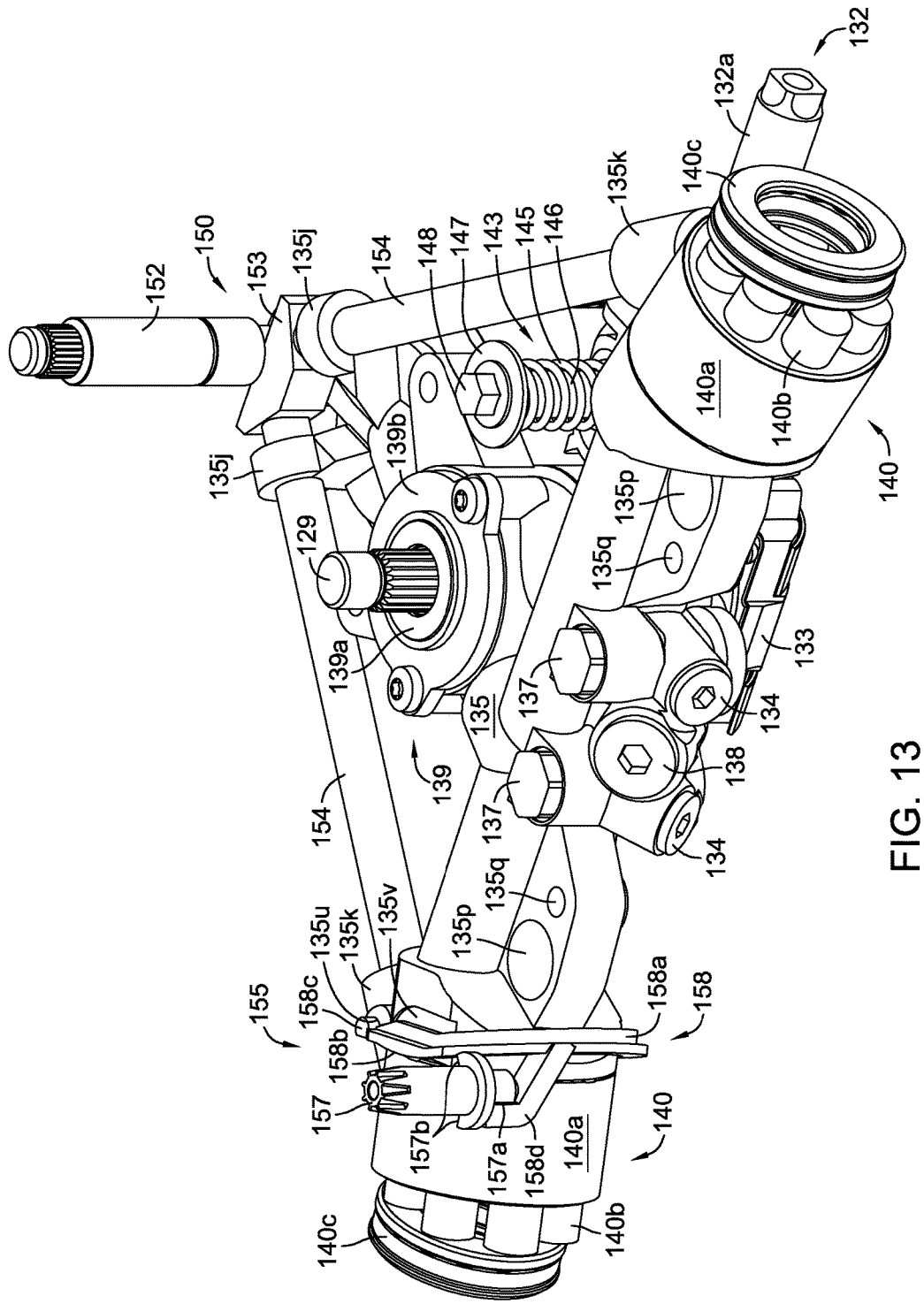
FIG. 13 is a top perspective view of the hydrostatic transmission of the transaxle of FIG. 3 including brake, bypass, and RTN mechanisms.
Figure 14:
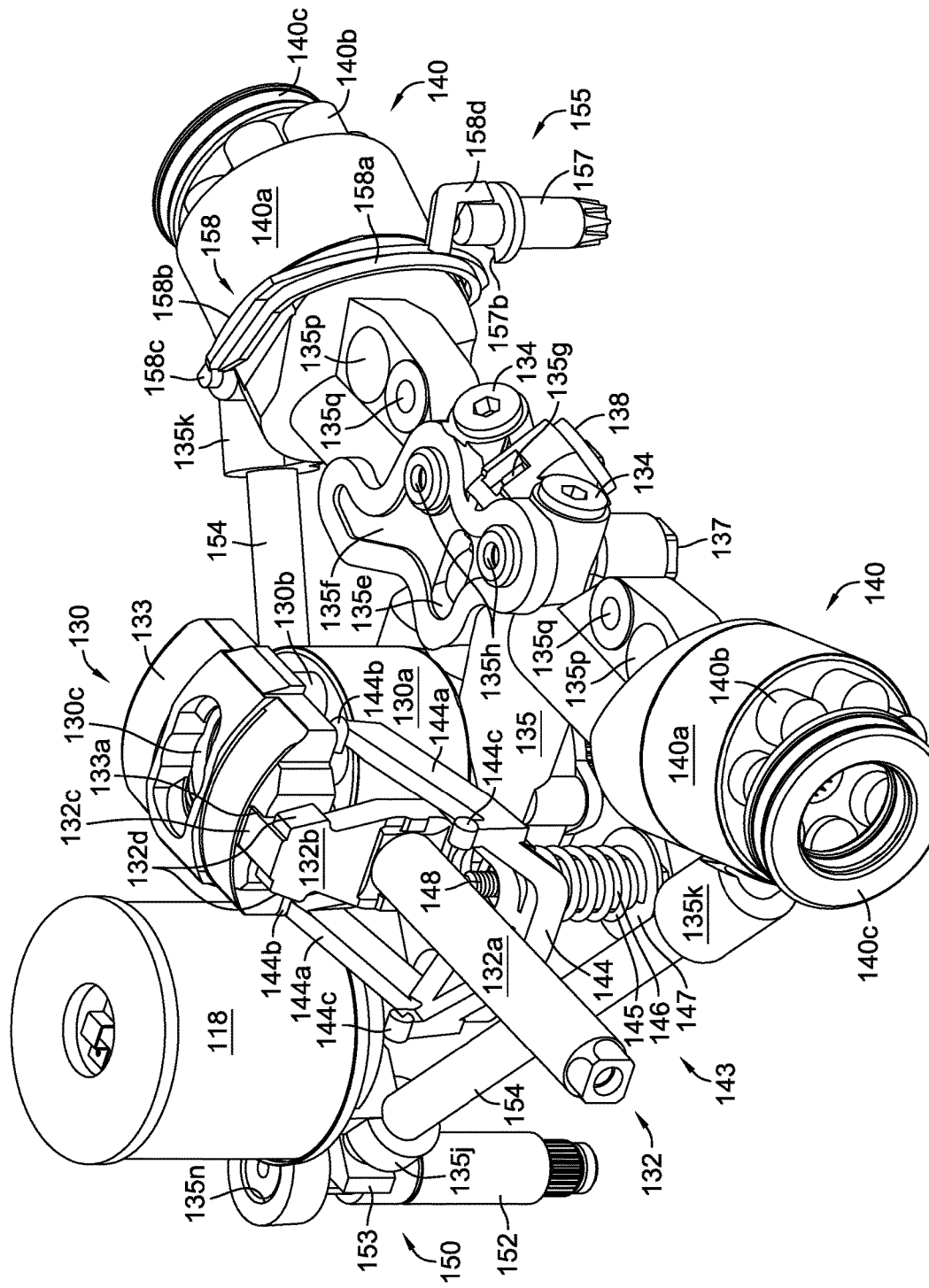
FIG. 14 is a bottom perspective view of the hydrostatic transmission of the transaxle of FIG. 3 including brake, bypass, and RTN mechanisms.

A return-to-neutral (RTN) mechanism 143, shown in, e.g., FIGS. 11, 13, and 14, is provided to force swash plate 133 to return pump 130 to its initial hydraulic neutral position when an applied rotational force is removed from control arm 131. RTN mechanism 143 includes a return plate 144 having a pair of pivots 144*c* formed thereon that are seated in pivot recesses 121*t* formed in main housing 121 shown in FIG. 12. Return plate 144 also has a pair of tines 144*a* that extend toward swash plate 133. A pair of contactors 144*b* formed at the ends of tines 144*a* contact swash plate 133. A spring 145 is positioned about a spacer 146. One end of spring 145 bears against washer 147 and the other end bears against pocket 144*d* formed in return plate 144. Fastener 148 engages boss 121*v* formed in housing 121 to secure washer 147, spring 145 and spacer 146, with spacer 146 setting the proper compressed height of spring 145 when fastener 148 is installed. A neutral set screw 149 (shown in FIG. 5) is provided in opening 121*u* formed adjacent one of pivot recesses 121*t*. Neutral set screw 149 bears against one of pivots 144*c* to adjust the position of return plate 144 to align swash plate 133 into the initial hydraulic neutral position wherein swash plate 133 is approximately parallel to pump running surface 135*a*.

Referring to FIGS. 11, 12, 13, and 14, motor assemblies 140 are generally of the same axial piston configuration as pump assembly 130. Each motor assembly 140 comprises a motor cylinder block 140*a* carrying a set of spring-biased pistons 140*b* that bear against a thrust bearing 140*c*. Each motor cylinder block 140*a* is disposed on a running surface 135*b* formed on center section 135, and each motor running surface 135*b* forms a plane, wherein the two planes are not parallel, but both such planes are perpendicular to a plane formed by pump running surface 135*a*. This center section configuration affects the overall geometry of transaxle 115 and enhances the ability of a vehicle so equipped, such as vehicle 100 of FIG. 1, to execute tight turns by providing additional clearance for the inside steered wheel during a turn, e.g. steered wheel 110*a* during a left-hand turn. It should be understood, however, that a transaxle similar to transaxle 115 but having substantially parallel motor running surfaces (not shown) is also contemplated within the scope of the invention.

Each thrust bearing 140*c* is seated in a pocket 121*q* of main housing 121 at a fixed angle relative to its associated running surface 135*b*, such that motor assemblies 140 provide fixed displacement output. As is known in the art, a valve plate (not shown) may be disposed on each of pump and motor running surfaces 135*a*, 135*b* to reduce wear and extend the service life of transaxle 115.

As shown in FIGS. 9 and 10, motor assemblies 140 are hydraulically driven by pump 130 via porting 135*i* formed in center section 135. Porting 135*i* hydraulically connects pump running surface 135*a* to each of the two motor running surfaces 135b and also connects the two motor running surfaces 135b to one another to form a closed-loop hydraulic circuit. Porting 135i also includes passages and ports formed in center section 135 to communicate with valves that regulate fluid flow and pressure in the hydraulic circuit.

As shown in FIG. 9, hydraulic fluid from sump 120 passes through a filter 118 disposed on filter seal land 135m formed on center section 135 and seated in filter pocket 121r formed in main housing 121. Filter pocket 121r is adjacent swash plate pocket 121s. The bottom surface of filter pocket 121r bears against filter 118 to maintain a seal against seal land 135m. Filtered fluid from filter 118 passes through a charge inlet passage 135d formed in center section 135 to gerotor charge pump 139. Charge pump 139 then pumps fluid through charge outlet passage 135e formed in center section 135 into a charge gallery 170 that serves to supply pressurized make-up fluid needed due to fluid losses from porting 135i during operation of transaxle 115.

Charge gallery 170 is formed by the alignment and sealing of charge gallery pockets 121i and 135f along seal groove 121x and mating seal land 135r, when center section 135 is attached to main housing 121. Shock valve inlet openings 135h are disposed in charge gallery 170 so that a pair of shock valves 137, disposed on shock valve openings 135h, is in hydraulic communication with charge gallery 170. Each of shock valves 137 is also in communication with one side of the hydraulic circuit, i.e., either the low pressure side or high pressure side. Shock valves 137 allow make-up hydraulic fluid to be drawn through shock valve 137 that is in communication with the low pressure or suction side of the hydraulic circuit, thereby compensating for fluid losses during operation of transaxle 115.

Shock valves 137 can be of the configuration claimed in commonly-owned U.S. Pat. No. 7,066,199, which is incorporated herein in its entirety. Alternatively, simple poppet valves may be used in lieu of shock valves 137. Also in communication with charge gallery 170 is charge relief valve 138 which, during normal operation, remains open to bleed excess charge fluid to sump 120 through openings 135g formed in center section 135. Charge relief valve 138 closes when fluid pressure in charge gallery 170 drops below a predetermined minimum due to increased demand from the hydraulic circuit. Plugs 134 shown adjacent charge relief valve 138 are used to seal machined passages of porting 135i that communicate with shock valves 137.

PTO mechanism 160 is illustrated in, e.g., FIGS. 9, 10, 11, and 12. PTO mechanism 160 is substantially supported in a centrally located, open pocket 121p formed in main housing 121.

Referring to FIGS. 9, 10, and 12, charge gallery 170 is also in hydraulic communication with PTO valve assembly 116 which, in the illustrated embodiment, is a solenoid-actuated valve assembly. In this embodiment, PTO valve assembly 116 has a solenoid 116a to operate a 2-position, 3-way spool valve 116b. In an alternative embodiment (not shown), valve 116b can be operated manually via operator-controlled linkage (not shown).

PTO valve assembly 116 controls flow of hydraulic fluid from charge gallery 170 to either PTO drive tube 161 to engage PTO mechanism 160 or to sump 120 to disengage PTO mechanism 160. When solenoid 116a is energized, flow is allowed from a first port 116e to a second port 116c, while a third port 116d is blocked. Therefore, when solenoid 116a is energized, pressurized fluid flows from charge gallery 170 through an opening 121j formed in charge gallery pocket 121i, through valve 116b, and through passage 121m to cause engagement of PTO mechanism 160.

When solenoid 116a is de-energized, flow is allowed from second port 116c to third port 116d, while first port 116e is blocked. Therefore, when solenoid 116a is de-energized, fluid flows from PTO mechanism 160 through passage 121m, through valve 116b, through opening 121k formed adjacent charge gallery pocket 121i, and into sump 120, thereby causing PTO mechanism 160 to disengage.

To engage the clutch mechanism of PTO mechanism 160, pressurized fluid flows through passage 121m and into annulus 121n formed in main housing 121. Annulus 121n communicates with a fluid passage 161a formed in a drive tube 161 that is rotationally supported in main housing 121. A lower portion of input tube 126 is rotationally supported by drive tube 161. Pressurized fluid flows through passage 161a and then through openings 162a formed in clutch basket 162 to act against and move piston 165 in a first direction. Movement of piston 165 in this first direction forces clutch plates 163, portions of which are carried by clutch gear 127 and basket 162, against one another and against clutch collar 168. This force induces frictional clutch engagement that causes clutch basket 162 and drive tube 161 to rotate together with clutch gear 127 and input tube 126. Clutch basket 162 is drivingly engaged to drive tube 161 by mating splines or the like.

Piston 165 is biased by a spring 166 in a second direction, opposite the first direction, to push a clutch ring 167 against brake plates 164, a portion of which is carried by clutch basket 162 and a non-rotating portion of which is engaged to main housing 121, so that basket 162 is braked when pressurized fluid is removed from piston 165 and dumped to sump 120 through valve 116b to return PTO mechanism 160 to its disengaged, braked state.

A pulley 117 can be attached to drive tube 161 of PTO mechanism 160 to enable selective driving of vehicle equipment, such as blades 104 of mowing deck 105 of vehicle 100 shown in FIG. 1, via belt and pulley system 103.

Referring to, e.g., FIGS. 9, 10, 11, 13, 14, and 15, a bypass mechanism 155, shown as a block-lift bypass, is provided to allow an operator to effectively disconnect the hydraulic fluid circuit that exists between axial piston pump 130 and axial piston motors 140 to avoid resistance encountered when hydraulically driving unpowered transaxle 115. Actuation of bypass mechanism 155 allows hubs 199 to freely rotate so an operator of a vehicle can more easily move the vehicle without powering it. Bypass mechanism 155 includes a bypass arm 156 attached to a bypass actuation shaft 157 that is rotationally supported in and extends from housing cover 122. Bypass actuation shaft 157 is oriented generally parallel to pump input shaft 129 and includes a cam surface 157a formed at its distal end. A generally U-shaped block-lift member 158 is pivotably disposed on and straddles a portion of center section 135 proximate to one of the two motor running surfaces 135b. Block-lift member 158 comprises a bail 158a having two pivots 158c formed at opposite ends thereof to engage corresponding pivot recesses 135u formed adjacent flat surfaces 135v formed on center section 135. Flat surfaces 135v help position block-lift member 158 while providing clearance for the pivoting motion of bail 158a. Bail 158a includes two lift surfaces 158b formed thereon to bear against opposite sides of cylinder block 140a to provide balanced lifting of cylinder block 140a to prevent damage to motor running surface 135b when bypass mechanism 155 is actuated. To facilitate actuation, an actuation bar 158d extends from bail 158a to engage with cam surface 157a. When bypass arm 156 and actuation shaft 157 are pivoted either clockwise or counterclockwise, cam surface 157a bears against actuation bar 158*d* to force bail 158*a* to pivot, thereby lifting cylinder block 140*a* from running surface 135*b*. Actuation shaft 157 includes a pair of rotational stops 157*b* formed thereon that interface with a mating stop member, shown as post 122*b* formed on the interior side of housing cover 122, to limit rotation of shaft 157 in order to limit the distance that motor cylinder block 140*a* is lifted from motor running surface 135*b*.

As shown in, e.g., FIGS. 9, 11, 13, and 14, a brake mechanism 150 is also provided. Brake mechanism 150 is ideally used as a static parking brake, but may have some dynamic braking capability dependent upon materials used, coefficients of friction, size of components, weight of a vehicle in which transaxle 115 is installed, etc. Brake mechanism 150 includes a brake arm 151 attached to a brake shaft 152 that extends from housing cover 122. Brake shaft 152 is pivotably supported proximate to its upper end in housing cover 122 and at its lower end in opening 135*n* formed in center section 135. It will be understood that brake shaft 152 could also be pivotably supported at its lower end elsewhere in the main housing 121, such as by a pocket (not shown) in the main housing itself. A pair of brake rods 154 is supported by a first set of brake rod guides 135*j* proximate to a first end of each brake rod 154 and by a second set of brake rod guides 135*k* proximate to a second end of each brake rod 154.

Referring to, e.g., FIGS. 11, 13, and 15, first set of brake rod guides 135*j* is integrally formed with center section 135 adjacent filter land 135*m* while second set of brake rod guides 135*k* is integrally formed with center section 135 adjacent motor running surfaces 135*b*. Brake shaft 152 includes an integrally formed cam 152*a* (shown in FIG. 9) that exerts force against a force transfer member, shown as a puck 153, when brake shaft 152 is pivoted. In turn, force transfer member 153 simultaneously exerts force against the first end of both brake rods 154 which in turn exert force against both motor cylinder blocks 140*a*. Brake rods 154 contact motor cylinder blocks 140*a* at an oblique angle, thereby applying more braking force to cylinder blocks 140*a* with less applied force to brake arm 151 than would likely be required to achieve similar braking results if brake rods 154 contacted cylinder blocks 140*a* at right angles. Brake arm 151 can be pivoted either clockwise or counterclockwise to affect braking of motor cylinder blocks 140*a*.

Each motor cylinder block 140*a* is drivingly engaged to a motor shaft 141 having a pinion gear 142 affixed thereon to drive the reduction gears of steerable hub assemblies 190*a* and 190*b*. Therefore, steerable hub assemblies 190*a* and 190*b*, including wheel hubs 199, are braked when motor cylinder blocks 140*a* are braked.

Each motor shaft 141 is supported near its driven end in a journal opening 135*t* formed in center section 135. Each journal opening 135*t* may have a journal bearing installed therein to improve wear characteristics. Each motor shaft 141 also drives a pinion gear 142 and is supported near pinion gear 142 at its driving end by a bearing (not shown) supported in each motor shaft housing 123*a*, 123*b*.

Referring to, e.g., FIGS. 3, 4, and 5, each pinion gear 142 drives an upper bevel gear 194 (disposed in sump 120) that is drivingly engaged to a gear shaft 197 by splines or the like. Each gear shaft 197 is rotationally supported near its upper end by a bearing mounted in one of motor shaft housings 123*a*, 123*b* and extends downward and out of housing 123*a*, 123*b* through a pivot tube 198 that is also supported in motor shaft housing 123*a*, 123*b*. At its lower end, each gear shaft 197 is engaged, by splines or the like, to a lower bevel gear 196 that drives a hub gear 195. Each hub 199 is rotationally supported by bearings disposed on a spindle 193 and is drivingly engaged to hub gear 195. Each spindle 193 and, therefore, each hub assembly 190*a*, 190*b*, pivots about the rotational axis of shaft 197. Each spindle 193 is supported by bearings positioned above and below bevel gear 196. The bearing positioned below bevel gear 196 is supported in a thrust plug 192 that may be separated from the bearing positioned above bevel gear 196 by a generally conical spacer (not shown). Each spindle 193 is also supported above gear shaft 197 by a pivot pin 191 that is rotationally supported in a bearing installed in the upper portion of spindle 193.

Center section 135, shown in, e.g., FIGS. 9, 10, 11, 13, 14, and 15, is attached to main housing 121 by inserting fasteners 136 through openings 135*q* to engage bosses 121*w*. Support members or tubes 121*e* protrude through openings 135*p* to align center section 135 during assembly. After internal components are assembled into main housing 121, support tubes 121*e* are slip-fit and sealed with mating support members or tubes 122*a* of housing cover 122 to form support structures 114 that provide openings 114*a* through transaxle 115 for attachment of prime mover 102 with fasteners 113 shown in FIG. 2. Additionally, fasteners 112 are installed through a vehicle frame 101 and through aligned openings 121*f*, 122*c* to secure both transaxle 115 and prime mover 102 to vehicle frame 101. Additional fasteners 111 are provided as needed to further secure transaxle 115 to vehicle frame 101.

While one or more specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of any appended claims and any equivalent thereof.

I claim:

1. A drive apparatus for a vehicle having a prime mover, the drive apparatus comprising:
   a housing forming an internal sump;
   a transmission disposed in the internal sump and comprising:
      a center section containing hydraulic porting;
      a hydraulic pump disposed on the center section; and
      a first hydraulic motor engaged to and driving a first motor shaft and a second hydraulic motor engaged to and driving a second motor shaft, wherein both hydraulic motors are disposed on the center section and in hydraulic communication with the hydraulic pump through the hydraulic porting to form a hydraulic circuit; and
   a brake mechanism having a brake shaft pivotably supported in the housing, a brake arm attached to the brake shaft, and a first brake rod and a second brake rod each supported by a plurality of brake rod guides formed in the center section.

2. The drive apparatus of claim 1, wherein:
   the first hydraulic motor comprises a first motor cylinder block and the second hydraulic motor comprises a second motor cylinder block;
   the first brake rod has a first end and a second end, wherein the second end is adjacent to the and capable of engaging with the first motor cylinder block to providing a first braking force thereto; and
   the second brake rod has a first end and a second end, wherein the second end is adjacent to the and capable of engaging with the second motor cylinder block to providing a second braking force thereto.

3. The drive apparatus of claim 1, wherein the plurality of brake rod guides includes a first set of brake rod guides adjacent the brake shaft and a second set of brake rod guides, each of the second set of brake rod guides located adjacent one of the first hydraulic motor and the second hydraulic motor.

4. The drive apparatus of claim 3, further comprising a cam on the brake shaft and a force transfer member in contact with the cam and in contact with a first end of each of the brake rods, wherein pivoting of the brake shaft causes a second end of the first brake rod to contact and brake the first hydraulic motor and a second end of the second brake rod to contact and brake the second hydraulic motor.

5. The drive apparatus of claim 4, wherein the cam is integrally formed on the brake shaft.

6. The drive apparatus of claim 1, wherein the first and second brake rods contact the first and second hydraulic motors, respectively, at oblique angles.

7. The drive apparatus of claim 1, wherein the center section has a first motor running surface at a first end of the center section and defining a first plane, a second motor running surface at a second end of the center section and defining a second plane, and a pump running surface on a middle portion of the center section and defining a third plane, wherein the first plane is not parallel to the second plane, and the first plane and the second plane are both perpendicular to the third plane.

8. The drive apparatus of claim 1, wherein one end of the brake shaft is pivotably supported by the center section.

9. The drive apparatus of claim 1, wherein the center section further comprises a filter land formed thereon and capable of receiving a filter, wherein the filter is connected to the hydraulic porting and to the internal sump.

10. A drive apparatus, comprising:
a housing forming an internal sump;
a center section disposed in the internal sump and comprising a pump running surface, a motor running surface, and hydraulic porting formed in the center section for connecting the pump running surface and the motor running surface;
a hydraulic pump disposed on the pump running surface and connected to the hydraulic porting in the center section; and
a hydraulic motor disposed on the motor running surface and engaged to and driving a motor shaft;
a first brake rod guide extending from the center section adjacent the pump running surface and a second brake rod guide extending from the center section adjacent the motor running surface; and
a brake mechanism having a brake shaft pivotably supported in the housing, a brake arm attached to the brake shaft and a brake rod operatively engaged to the brake shaft, wherein the brake rod is supported by the first brake rod guide and the second brake rod guide.

11. The drive apparatus of claim 10, wherein the center section further comprises a support member extending therefrom and having an opening formed therein, wherein one end of the brake shaft is pivotably supported in the opening of the support member.

12. The drive apparatus of claim 11, further comprising a cam on the brake shaft and a force transfer member in contact with the cam and in contact with a first end of the brake rod, wherein pivoting of the brake shaft causes a second end of the brake rod to contact and brake the hydraulic motor.

13. The drive apparatus of claim 10, wherein the hydraulic motor comprises a motor cylinder block and the brake rod has a first end and a second end, wherein the second end is adjacent to and capable of engaging with the motor cylinder block to providing a braking force thereto.

14. The drive apparatus of claim 13, wherein the brake rod contacts the motor cylinder block at an oblique angle to provide the braking force thereto.

15. The drive apparatus of claim 10, wherein the hydraulic motor is a first hydraulic motor and the motor shaft is a first motor shaft and the brake rod is a first brake rod, the drive apparatus further comprising:
a second motor running surface formed on the center section and connected to the pump running surface through at least a portion of the hydraulic porting;
a second hydraulic motor disposed on the second motor running surface and engaged to and driving a second motor shaft;
a third brake rod guide extending from the center section adjacent the pump running surface and a fourth brake rod guide extending from the center section adjacent the second motor running surface; and
wherein the brake mechanism comprises a second brake rod supported by the third brake rod guide and the fourth brake rod guide, and the second brake rod is operatively engaged to the brake shaft.

16. The drive apparatus of claim 15, further comprising a cam on the brake shaft and a force transfer member in contact with the cam and in contact with the first brake rod and the second brake rod, wherein pivoting of the brake shaft causes the first brake rod to contact and brake the first hydraulic motor and the second brake rod to contact and brake the second hydraulic motor.

17. The drive apparatus of claim 15, wherein:
the first hydraulic motor comprises a first motor cylinder block and the second hydraulic motor comprises a second motor cylinder block;
the first brake rod has a first end and a second end, wherein the second end is adjacent to the and capable of engaging with the first motor cylinder block to providing a first braking force thereto; and
the second brake rod has a first end and a second end, wherein the second end is adjacent to the and capable of engaging with the second motor cylinder block to providing a second braking force thereto.

18. The drive apparatus of claim 17, wherein the first brake rod contacts the first motor cylinder block at a first oblique angle and the second brake rod contacts the second motor cylinder block at a second oblique angle.

19. The drive apparatus of claim 15, wherein the center section further comprises a support member extending therefrom and having an opening formed therein, wherein one end of the brake shaft is pivotably supported in the opening of the support member.

20. The drive apparatus of claim 10, wherein the center section further comprises a filter land formed thereon and capable of receiving a filter, wherein the filter is connected to the internal porting and to the internal sump.

21. A drive apparatus, comprising:
a housing forming an internal sump;
a center section disposed in the internal sump and comprising a pump running surface and a motor running surface, internal porting formed in the center section for hydraulically connecting the pump running surface and the motor running surface;

a hydraulic pump disposed on the pump running surface and connected to the internal porting in the center section; and a hydraulic motor disposed on the motor running surface and engaged to and driving a motor shaft; and a brake mechanism having a brake shaft pivotably supported in the housing, a brake arm attached to the brake shaft and a brake rod operatively engaged to the brake shaft, wherein the brake rod is fully supported by the center section.

* * * * *